United States Patent
Goodman (10) Patent No.: US 10,335,897 B2
(45) Date of Patent: Jul. 2, 2019

(54) LASER ABLATION OF ACCELEROMETER PROOF MASS

(71) Applicant: William Goodman, Sunnyvale, CA (US)

(72) Inventor: William Goodman, Sunnyvale, CA (US)

(73) Assignee: Applied Physics, Inc., Mountain View, CA (US)

( * ) Notice: Subject to any disclaimer, the term of this patent is extended or adjusted under 35 U.S.C. 154(b) by 303 days.

(21) Appl. No.: 15/222,671

(22) Filed: Jul. 28, 2016

(65) Prior Publication Data

US 2018/0029160 A1    Feb. 1, 2018

(51) Int. Cl.
| | | |
|---|---|---|
| *B23K 26/0622* | (2014.01) | |
| *G01P 15/125* | (2006.01) | |
| *B23K 26/361* | (2014.01) | |
| *B23K 26/402* | (2014.01) | |
| *G01P 15/08* | (2006.01) | |
| *B23K 103/00* | (2006.01) | |

(52) U.S. Cl.
CPC ........ *B23K 26/0624* (2015.10); *B23K 26/361* (2015.10); *B23K 26/402* (2013.01); *G01P 15/0802* (2013.01); *G01P 15/125* (2013.01); *B23K 2103/50* (2018.08); *B23K 2103/54* (2018.08)

(58) Field of Classification Search
CPC .............. B23K 26/0624; B23K 26/361; B23K 26/402; B23K 2103/50; G01P 15/0802; G01P 15/125; Y10T 29/42
See application file for complete search history.

(56) References Cited

U.S. PATENT DOCUMENTS

| | | | | |
|---|---|---|---|---|
| 3,702,073 A | | 11/1972 | Jacobs | |
| 4,394,405 A | * | 7/1983 | Atherton | G01P 15/132 216/59 |
| 4,399,700 A | * | 8/1983 | Hanson | G01P 15/132 73/514.23 |
| 4,658,647 A | * | 4/1987 | Shintani | G01P 1/006 73/497 |
| 5,182,949 A | * | 2/1993 | Rupnick | G01P 15/132 73/514.01 |
| 5,203,210 A | * | 4/1993 | Terry | G01P 15/132 73/514.17 |
| 5,524,488 A | | 6/1996 | Foote | |
| 5,693,883 A | * | 12/1997 | Giroud | G01P 15/132 73/514.24 |

(Continued)

*Primary Examiner* — Peter Dungba Vo
*Assistant Examiner* — Jeffrey T Carley
(74) *Attorney, Agent, or Firm* — Tran & Associates (57) ABSTRACT

A system for producing a proof-mass assembly includes a translation stage to receive a flapper hingedly supported by a bifilar flexure that extends radially inwardly from a support ring, wherein the bifilar flexure comprises a pair of flexure arms spaced apart by an opening or window; and a femtosecond laser optically coupled to the translation stage with focusing optics, the femtosecond laser applying a laser beam on the flexure arms over a plurality of passes to gradually thin the bifilar flexure regions, the laser periodically reducing a laser output to minimize damage from laser scanning and maximize bifilar flexure strength until the bifilar flexure reaches a predetermined thickness.

9 Claims, 5 Drawing Sheets

(56) References Cited

U.S. PATENT DOCUMENTS

| | | | | |
|---|---|---|---|---|
| 6,032,531 | A * | 3/2000 | Roszhart | G01C 19/56 73/504.04 |
| 6,563,998 | B1 * | 5/2003 | Farah | G02B 6/138 385/131 |
| 7,049,543 | B2 * | 5/2006 | Roos | B23K 26/361 219/121.69 |
| 8,516,887 | B2 * | 8/2013 | Acar | G01C 19/5712 73/504.08 |
| 9,658,244 | B2 * | 5/2017 | Dwyer | G01P 15/125 |
| 10,036,765 | B2 * | 7/2018 | Dwyer | G01P 15/125 |
| 2003/0155667 | A1 * | 8/2003 | Devoe | B29C 35/08 264/1.27 |
| 2008/0089637 | A1 * | 4/2008 | Farah | G02B 6/30 385/14 |
| 2010/0192662 | A1 | 8/2010 | Yanni | |
| 2012/0230641 | A1 * | 9/2012 | Donlagic | G01D 5/3538 385/127 |
| 2013/0216779 | A1 * | 8/2013 | Hofmeister | G03F 7/0002 428/141 |
| 2015/0027779 | A1 | 1/2015 | Sugiara | |

* cited by examiner

LASER ABLATION OF ACCELEROMETER PROOF MASS

This application is related to Application entitled "ACCELEROMETER WITH BUILT-IN TEMPERATURE CORRECTION FACTORS" with Ser. No. 15/222,696, filed concurrently herewith, the content of which is incorporated-by-reference.

BACKGROUND

The present invention relates to laser trimming of an accelerometer proof mass.

An accelerometer of the type described herein typically employs a damped proof mass (also known as seismic mass) supported by one or more hinges. Under the influence of external accelerations the proof mass deflects from its neutral position. This deflection is measured and nulled by application of an electromagnetic force feedback. The acceleration is calculated from the measured value of force feedback required to null the proof mass deflection.

Amorphous quartz is commonly used to fabricate the accelerometer proof mass. Quartz has two qualities that make it particularly attractive for proof mass use; 1) It has a very small coefficient of thermal expansion and; 2) it is brittle or in other terms its ductility is very low. The first of these properties results in high stability over a large temperature range (e.g. −40 C to +150 C). The second of these properties results in excellent shock performance. The proof mass and support hinges are not deformed by high shock.

The quartz proof mass is conventionally fabricated using wet-etch techniques. Hydrofluoric (HF) acid is typically used as an etchant which attacks quartz at a high etch rate. Essentially the proof mass is coated with a photoresist that is exposed in areas where the proof mass is to be etched. The etch solution is generally a buffered and diluted HF acid solution. The proof mass is immersed in the acid solution for a specific time to enable thinning down of the proof mass support hinges. Generally the etch process reduces the hinge thickness from 0.030 inch to about 0.001 inch. However, stopping the etch process at the optimum hinge thickness can be difficult because of the minor variations in the etch rate (typically 0.005"/hour at an etch solution temperature of 70° C.).

SUMMARY

A system for producing a proof-mass assembly includes a translation stage to receive a flapper hingedly supported by a bifilar flexure that extends radially inwardly from a support ring, wherein the bifilar flexure comprises a pair of flexure arms spaced apart by an opening or window; and a femtosecond laser optically coupled to the translation stage with focusing optics, the femtosecond laser applying a laser beam on the flexure arms over a plurality of passes to gradually thin the bifilar flexure regions, the laser periodically reducing a laser output to minimize damage from laser scanning and maximize bifilar flexure strength until the bifilar flexure reaches a predetermined thickness.

Advantages of the preferred embodiment may include one or more of the following. The present system improves the process of thinning the proof mass hinges by eliminating entirely the etch process and substituting instead a laser ablation fabrication process. The laser fabrication process is highly controllable and reproducible as compared to the wet etch process. Many variables in the wet etch process including, for instance temperature, etch solution concentration, etch solution contamination, among others, make it difficult to produce the same results time after time. By contrast the laser fabrication process variables (laser power and raster pattern) are precisely controllable and hence the results of using the laser ablation fabrication process are highly reproducible.

As is well known there are several laser systems available commercially to ablate surfaces. The femtolaser is unique among these laser systems in that the pulse width is very short (e.g. typically <500 femtoseconds). The advantage of using a very short pulse to ablate material is that this enables very thin surfaces (e.g. the hinges supporting the accelerometer proof mass) to be ablated with minimal damage to the under surface or surrounding area of the ablate site.

BRIEF DESCRIPTION OF THE DRAWINGS

FIG. 2B shows a side view, while

FIG. 4A shows an exploded view of an accelerometer using the proof mass of FIG. 2C, while

DESCRIPTION

Figure 1:
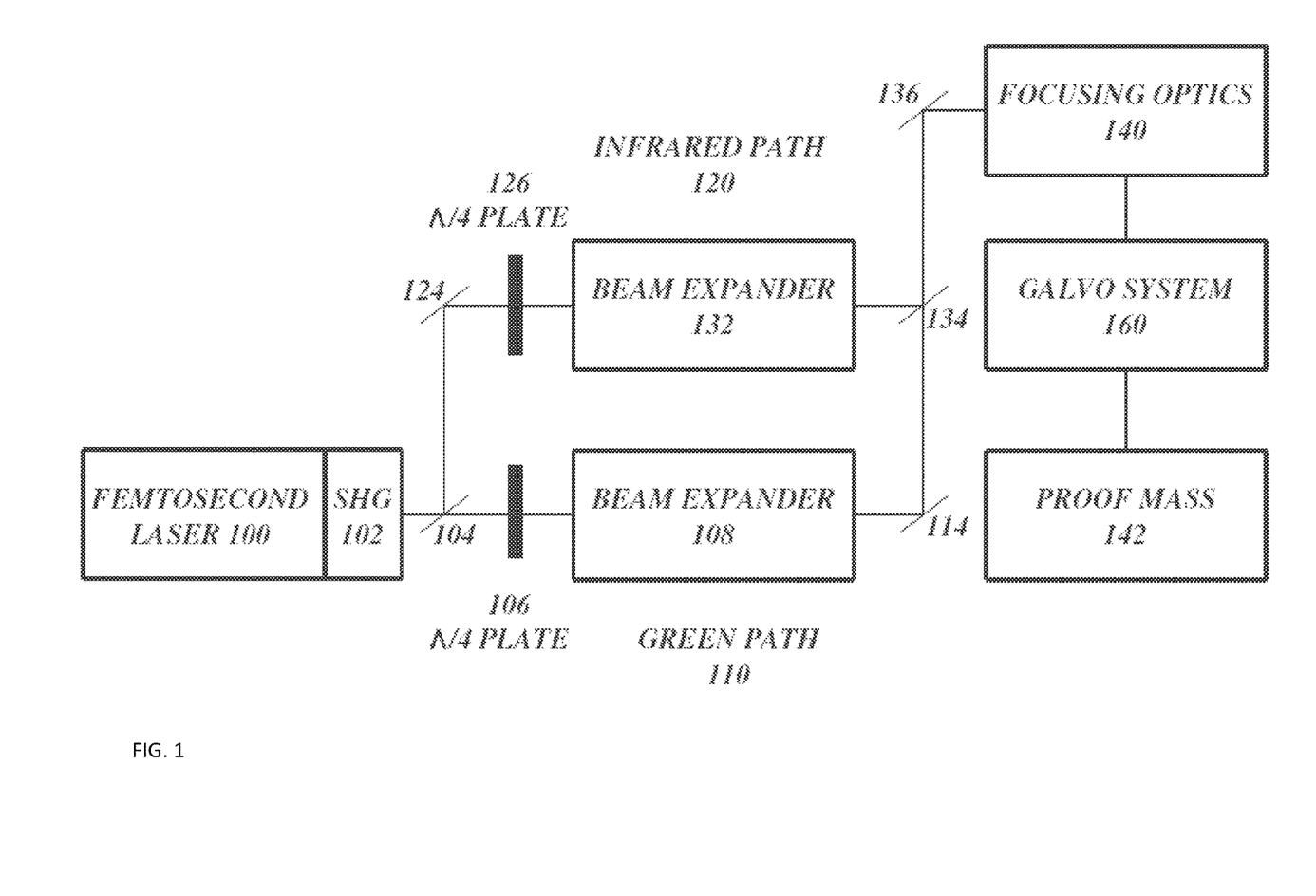
FIG. 1 shows an exemplary laser-based proof mass fabrication system.

A diagram showing the laser-based proof mass fabrication system is shown in FIG. 1. A femtosecond laser 100 produces light pulses at a frequency of 1040 nm (infrared light). This pulse can be used directly to ablate surfaces by using light path 120. The light output of the laser also is used to drive a frequency doubling or second harmonic generation (SHG) module 102.

The SHG module produces light with a wavelength of 520 nm (green light). The green light can be used to ablate material by using light path 110. The ability of being able to use either green or infrared light is that the absorption coefficient for quartz is slightly different for these two frequencies. The operation of the SHG module is controlled by the femptolaser software operating system and can be turned on or off depending on the frequency desired for the ablation process.

The femtosecond laser is advantageous in that the duration of the pulsed output is very short on the order of 400 nanoseconds. This short pulse width enables the ablation and removal of material at the laser focal spot without significant damage to surrounding material around or under the laser focal point. The femtosecond laser pulse width is much shorter that the pulse width of comparable laser technologies (e.g. excimer laser and neodymium:YAG laser) and this fact makes this laser technology highly suitable for the fabrication of the hinges of the accelerometer proof mass. The laser spot size is also an important parameter in the ablation process. Typical spot sizes of 5 microns can be achieved with the femptolaser and focusing optics. This enables concentration of the laser energy in a very small localized area contributing to the minimization of laser damage to surrounding areas.

Rastering of the laser is accomplished by using a galvanometer or galvo system 160 consisting of rotating mirrors. The output of the femptolaser 100 is provided to flip-mounted mirrors 104 to create a green path 110. In one embodiment, the light beam is sent through quarter wavelength plate 106 and then to a beam expander 108. The quarter wavelength plate convert the linearly polarized light from the femptolaser 100 to circularly polarized light which is more suitable for the ablation process. The beam expanders are required to reduce the power per square area of the beam so as to not damage the focusing lens. The expanded green beam is reflected from flip-mounted mirrors 114, 134 and 136 before entering the focusing optics 140.

Turning now to the infrared path 120, the femptolaser light beam is reflected by mirrors 104 and 124 to quarter wavelength plate 126 and then to a beam expander 132. The laser beam from expander 132 is sent to the flip-mounted mirror 134 which directs the beam to the focusing optics via mirror 136. The focusing optics reduces the beam diameter at the ablation site on the proof mass to about 5 microns. The proof mass 142 is located on an X-Y-Z translation stage, which can move the proof mass 142 to a position suitable for the ablation process to occur.

An important characteristic of a laser fabrication process in contrast to a wet etch process is that the laser process is highly controllable and reproducible as compared to a wet etch process. Many variables in the wet etch process including, for instance temperature, etch solution concentration, etch solution contamination, among others, make it difficult to produce the same results time after time. By contrast the laser fabrication process variables (laser power, raster pattern) are precisely controllable and hence the results of using this fabrication process are highly reproducible.

Figure 2A:
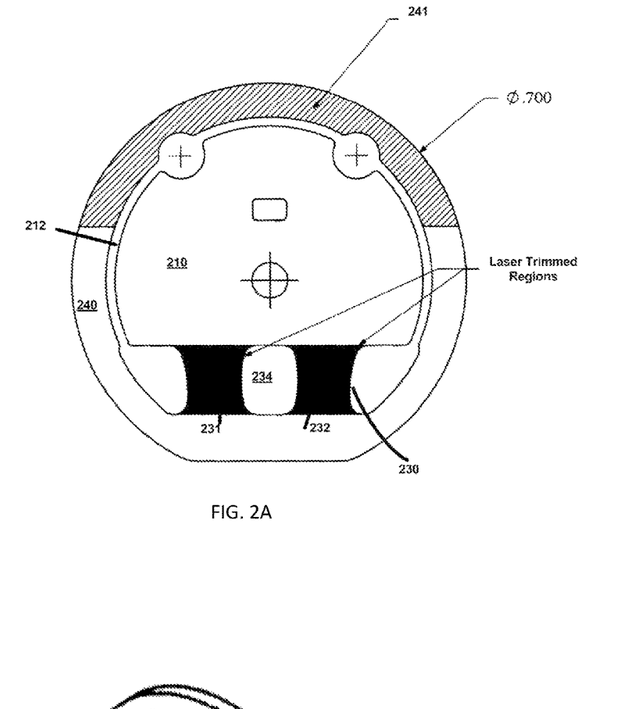
FIG. 2A shows a top view of an exemplary a proof mass formed using the system of FIG. 1 and the process shown in FIG. 3.
Figure 2B:
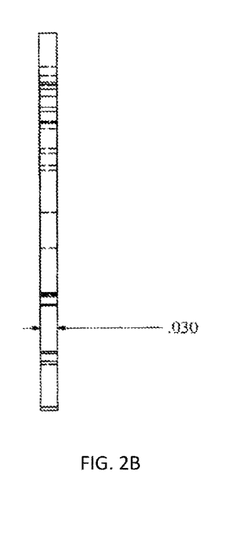
Figure 2C:
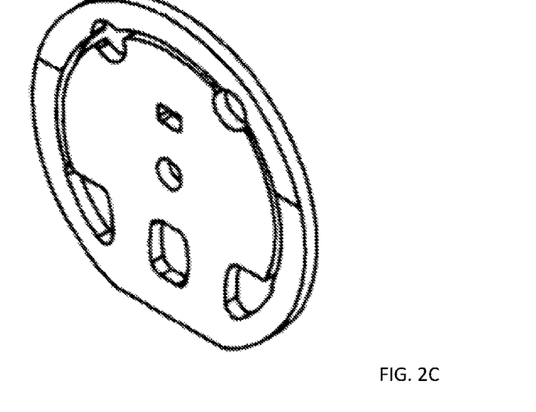
FIG. 2C shows a perspective view of the proof mass of FIG. 2A.
Figure 3:
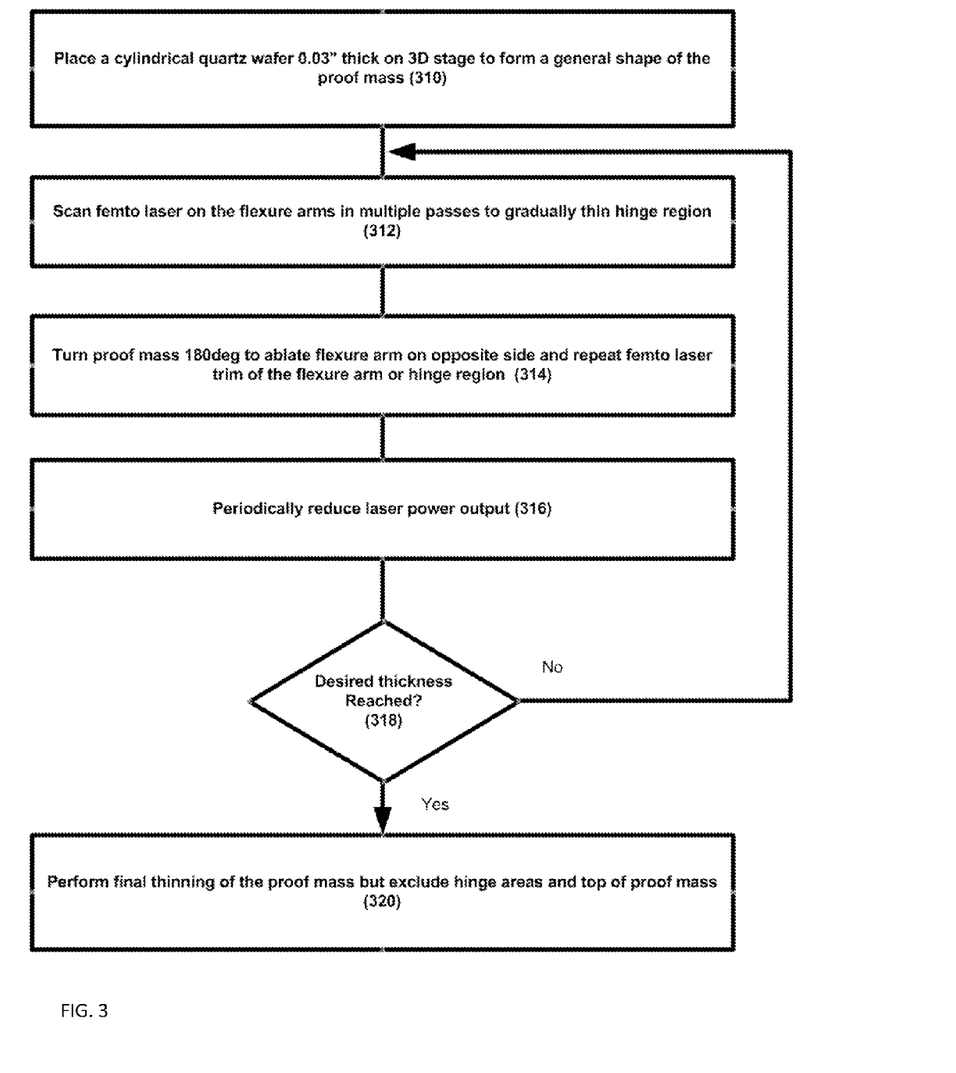
FIG. 3 shows an exemplary process for fabricating the proof mass of FIGS. 2A-2C.

FIG. 2A shows a top view of an exemplary a proof mass 200 formed using the system of FIG. 1 and the process shown in FIG. 3. FIG. 2B shows a side view, while FIG. 2C shows a perspective view of the proof mass of FIG. 2A. Turning now to FIG. 2, the proof-mass assembly 200 comprises a flapper or reed 210 hingedly supported by flexures 231 and 232 that extend radially inwardly from a support ring 240. The flapper 210 is of circular configuration except for parts adjacent the hinges 231 and 232 and is separated from the circular support ring 140 by a narrow annular or arcuate gap 212. The flapper 210 is of the same thickness as the main body of the ring 240 but approximately 0.002 inch thinner than the top arcurate section of the support ring 241 The proof mass support structure comprises a pair of flexure arms 231 and 232 spaced apart by an opening or window 234 with curvaceous corners, the arms being on opposite sides of the axis Z-Z of symmetry. By employing a multiple arm flexure, twisting of the flapper about the axis Z-Z of the flexure and other warpage that might occur in the flexure is reduced.

An arcuate electrode on the upper surface of proof mass 210 is created by metalizing this surface. Similarly, an arcuate electrode on the lower surface of proof mass is created by metalizing this surface. These electrodes act as one half of two capacitor plates. The other two one half capacitor plates are formed by an upper and lower pole piece described later with respect to FIG. 4. The proof mass and pole pieces are clamped together in such a manner that the two capacitors have equal values of capacitance when the flapper is in its neutral position. In addition, the proof mass and pole pieces are clamped together by two screws threading holes 242 and 243 such that only the top part 241 of arcurate support ring 240 is in contact with upper and lower pole pieces. This clamping design produces an approximate 0.001" gap between the proof mass top and bottom electrodes and the corresponding top and bottom pole pieces. Such a gap produces two matched capacitors with values of about 30 pF.

FIG. 3 shows an exemplary process for fabricating the proof mass of FIGS. 2A-2C. The basic fabrication of this takes part in three stages as follows:

1. Starting with a cylindrical quartz wafer of 0.030" thickness the general shape of the PM is fabricated using a laser such as a CO2 laser (310)
2. The hinge areas 231-232 shown in FIG. 2 are then thinned from 0.030" thickness to approximately 0.001" thickness. This is done by scanning the femtosecond laser on the flexure arms 231-232 over a plurality of passes to gradually thin the hinge regions 231-232 (312). Additionally, periodically, the proof mass is flipped so that the opposite sides of the hinge regions 231-232 are trimmed (314). The laser pulsed beam (pulsing occurs typically at 500,000 pulses/sec) is scanned over the hinge area in multiple passes to gradually thin the hinge region. By turning the proof mass by 180° the thinning process is achieved from both sides of the hinge equally. To build a robust hinge the areas where the hinge connects to thicker parts of the PM, are feathered to produces a gradual transition from a thick to a thin section.

In order to minimize the damage to the hinge volume, the laser power used to ablate the hinge material is reduced as the hinge approaches its final thickness (316). Reducing the laser power in this manner further reduces damage to the volume under the laser focal point and insures that the hinge at its final thickness of 0.001" is as strong as the amorphous quartz wafer from which it was formed.

This thinning is conventionally achieved by a photo etch process using a diluted hydrofluoric acid. In the case of the present invention this thinning is done with a femtosecond laser operating at 520 nm or 1040 nm wavelength. This laser produces a very short light pulse (about 400 femtoseconds long). Because the light pulse is very short the laser pulse removes material from the hinge area in an ablation process that minimizes the damage to the surrounding area or underlying substrate.

3. After thinning the hinge areas, a final thinning of the PM is accomplished by laser ablation to all of the PM areas shown in FIG. 2 but excluding the hinge areas and the cross hatched area 241 at the top of the PM (320). This final ablation enables the PM to be clamped between two pole pieces such that the only contact between the pole pieces and the PM is the cross hatched area 241 shown in FIG. 2.

Figure 4A:
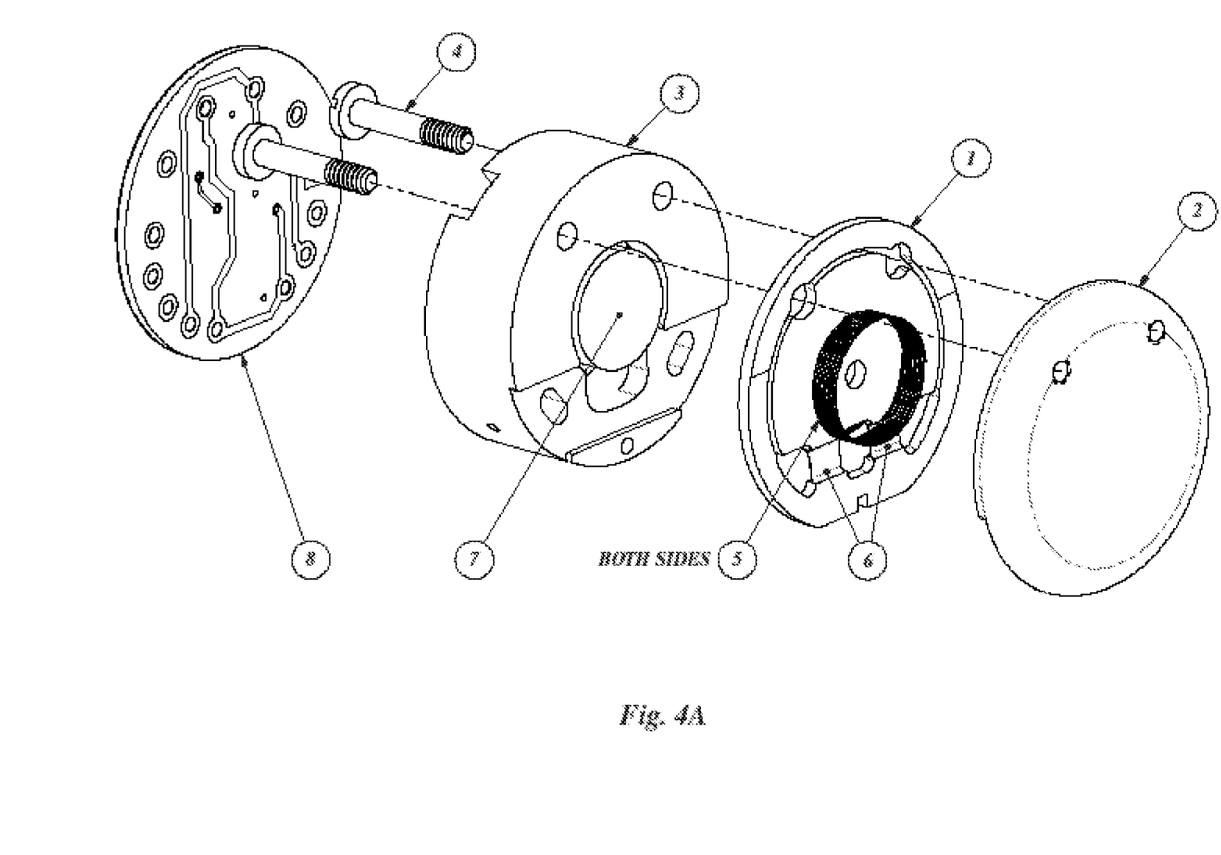
Figure 4B:
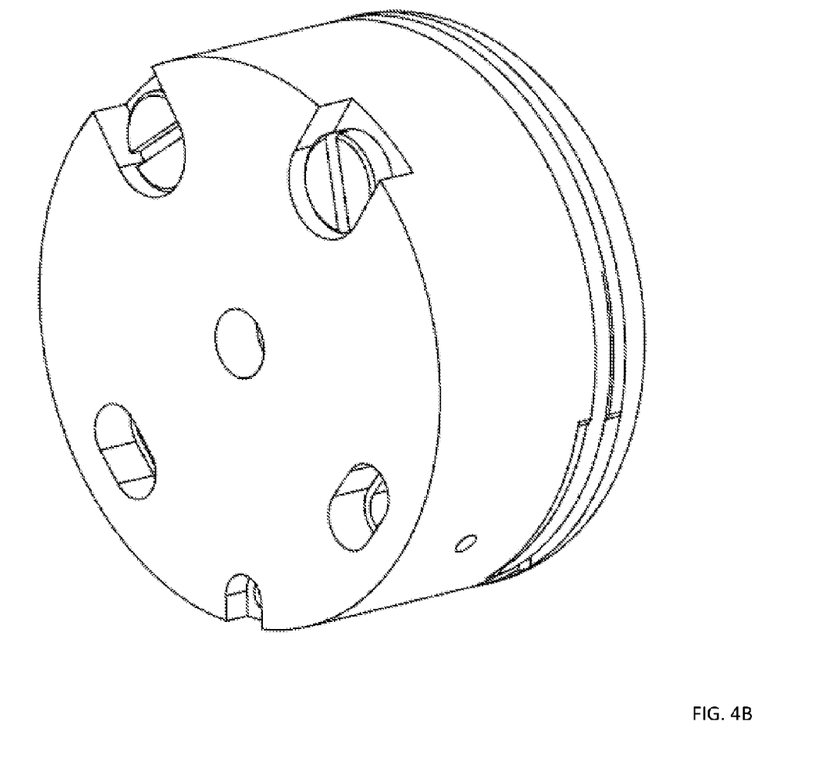
FIG. 4B shows the assembled accelerometer.

FIG. 4A shows an exemplary quartz proof mass 1 with two support hinges 6. In one embodiment, the support hinges 6 are laser trimmed, as described above. The proof mass 1 is positioned between first and second pole pieces 2 and 3. In one embodiment, the first pole piece 2 is fabricated from Invar which has a thermal expansion coefficient that closely matches amorphous quartz.

The bottom pole piece 2 has a magnet 7 mounted inside it which produces a magnetic field that cuts the feedback coil 3. When the feedback coil is energized with a current a force is applied to the coil and proof mass in such a way as to move the proof mass up and down on its hinges. This force is used to counter any movement of the proof mass due to accelerations or the pull of gravity. In such a manner of operation the proof mass is always maintained in a balanced or neutral position and the value of the current required to keep the proof mass centered (with equal upper and lower capacitances) is used as a measure of acceleration. The generic name for such a design is Torqeu Balance Accelerometer (TBA). The TBA electronics 8 is also shown in FIG. 4A. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

It will be understood that the flapper of this invention may be employed in other ways, and that the flapper and the accelerometer may be constructed in other ways. In particular, it will also be understood that the various parts of the flapper may be arranged in other configurations and may be employed in other types of accelerometers such as accelerometers in which the stator members are non-magnetic. It is therefore to be understood that the invention is not limited to the specific device described but may be embodied in many other forms and may be employed in many other ways within the scope of the appended claims.

Other types of materials may be employed in the construction of an accelerometer in accordance with this invention. Likewise, different configurations of the elements and positioning of the posts may be employed. It is, therefore, to be understood that the invention is not limited to the specific device disclosed but may be embodied in many other forms within the scope of the appended claims.

What is claimed is:

1. A method for producing a proof-mass assembly, comprising:
   forming a proof mass with a curved flapper hingedly supported at a straight end by a bifilar flexure that extends radially inwardly from a support ring, wherein one side of the bifilar flexure comprises a pair of adjacent flexure arms spaced apart by a window;
   scanning a femtosecond laser on the flexure arms over a plurality of passes to gradually thin bifilar flexure regions on a first side of the flexure arms;
   feathering with the femtosecond laser in areas where the flexure arms connect to the curved flapper or reed and producing a gradual transition from a thick to a thin section; and
   periodically reducing femtosecond laser output to minimize damage from laser scanning and maximize bifilar flexure strength until the bifilar flexure arms reach a predetermined thickness to form the proof-mass assembly.

2. The method of claim 1, comprising ablating a second side of the flexure arms.

3. The method of claim 2, wherein ablating the second side comprises:
   scanning a femtosecond laser on the flexure arms over a plurality of passes to gradually thin the bifilar flexure regions;

periodically reducing femtosecond laser output until the bifilar flexure reaches a predetermined thickness to minimize damage from laser scanning and maximize the bifilar flexure strength.

4. The method of claim 1, wherein the flapper comprises a circular configuration except for parts adjacent the bifilar flexure and is spaced from the support ring by an annular or arcuate gap.

5. The method of claim 1, comprising wherein the window comprises curvaceous corners.

6. The method of claim 1, wherein the flapper is of the same thickness as a support ring except at a top arcuate area of the support ring.

7. The method of claim 1, wherein the proof-mass assembly is formed from a quartz wafer.

8. The method of claim 1, comprising providing an arcuate electrode on an upper surface of the flapper opposite a first pole piece and providing another arcuate electrode on a lower surface of the flapper opposite a second pole piece.

9. The method of claim 8, wherein each electrode forms a capacitor plate.

* * * * *